US010758927B2

(12) United States Patent
Urban et al.

(10) Patent No.: US 10,758,927 B2
(45) Date of Patent: Sep. 1, 2020

(54) ROTARY DEVICE

(71) Applicant: Commonwealth Scientific and Industrial Research Organisation, Acton, Australian Capital Territory (AU)

(72) Inventors: Andrew Joseph Urban, Clayton (AU); Steven John Hogan, Clayton (AU)

(73) Assignee: COMMONWEALTH SCIENTIFIC AND INDUSTRIAL RESEARCH ORGANISATION (AU)

( * ) Notice: Subject to any disclaimer, the term of this patent is extended or adjusted under 35 U.S.C. 154(b) by 0 days.

(21) Appl. No.: 16/064,958

(22) PCT Filed: Dec. 21, 2016

(86) PCT No.: PCT/AU2016/051266
§ 371 (c)(1),
(2) Date: Jun. 21, 2018

(87) PCT Pub. No.: WO2017/106915
PCT Pub. Date: Jun. 29, 2017

(65) Prior Publication Data
US 2018/0369848 A1    Dec. 27, 2018

(30) Foreign Application Priority Data

Dec. 23, 2015  (AU) .............................. 2015905354
Oct. 3, 2016    (AU) .............................. 2016903998

(51) Int. Cl.
*B05B 13/02*       (2006.01)
*B05B 7/14*        (2006.01)
(Continued)

(52) U.S. Cl.
CPC ............. *B05B 13/0207* (2013.01); *B01J 8/06* (2013.01); *B01J 23/755* (2013.01);
(Continued)

(58) Field of Classification Search
None
See application file for complete search history.

(56) References Cited

U.S. PATENT DOCUMENTS 4,062,524 A   12/1977  Brauner et al.
4,220,416 A    9/1980  Brauner et al.
(Continued)

FOREIGN PATENT DOCUMENTS

EP   0 894 523 A1   2/1999
EP   1 837 070 A1   9/2007
(Continued)

OTHER PUBLICATIONS

International Search Report and Written Opinion of the International Searching Authority for International Patent Application No. PCT/AU2016/051266 dated Apr. 3, 2017, 12 pages.
(Continued)

Primary Examiner — Jethro M. Pence
(74) Attorney, Agent, or Firm — MH2 Technology Law Group LLP

(57) ABSTRACT

Some embodiments relate to an apparatus for holding a workpiece under tension while one or more operations are performed on the workpiece, the apparatus comprising: a frame; a first spindle rotatably coupled to the frame; a first coupler configured to couple the first spindle to a first end of the workpiece; a second spindle rotatably coupled to the frame; and a second coupler configured to couple the second spindle to a second end of the workpiece; wherein a distance between the first and second couplers is adjustable to hold the workpiece under tension between the couplers while the one or more operations are performed, and wherein the workpiece can be rotated with the couplers relative to the frame about a common axis of rotation extending between the couplers. Some embodiments relate to a system comprising a controller for controlling rotation of the workpiece.

(Continued)

Embodiments also relate to processes comprising holding a workpiece under tension while performing one or more operations on the workpiece. Some of the processes, systems and apparatuses described may be particularly useful for cold spraying delicate workpieces such as 3D printed static mixers.

7 Claims, 13 Drawing Sheets

(51) Int. Cl.
    *C23C 24/04*     (2006.01)
    *B01J 8/06*     (2006.01)
    *B01J 23/755*     (2006.01)

(52) U.S. Cl.
    CPC ........ *B05B 7/1486* (2013.01); *B05B 13/0228* (2013.01); *C23C 24/04* (2013.01); *B01J 2208/00831* (2013.01); *B01J 2208/00884* (2013.01); *B01J 2208/024* (2013.01); *B01J 2208/06* (2013.01)

(56) References Cited

U.S. PATENT DOCUMENTS

| | | | |
|---|---|---|---|
| 4,397,893 A | | 8/1983 | Bottoms |
| 4,400,309 A | | 8/1983 | McMahon et al. |
| 5,071,634 A | | 12/1991 | Maunula et al. |
| 6,299,810 B1 * | | 10/2001 | Blackinton, Jr. ....... B29C 53/66 264/102 |
| 6,942,767 B1 | | 9/2005 | Fazzina et al. |
| 7,887,764 B2 | | 2/2011 | Jernberg |
| 8,119,554 B2 | | 2/2012 | Kashani-Shirazi et al. |
| 2004/0005403 A1 * | | 1/2004 | Nesbitt .................. B05B 12/12 427/8 |
| 2007/0017633 A1 | | 1/2007 | Tonkovich et al. |
| 2007/0237692 A1 | | 10/2007 | Burd |
| 2007/0259099 A1 | | 11/2007 | Van Sciver |
| 2011/0078896 A1 | | 4/2011 | Calla et al. |
| 2014/0072481 A1 | | 3/2014 | Scahill |
| 2014/0183054 A1 | | 7/2014 | Legzdins |
| 2014/0236281 A1 * | | 8/2014 | Lee .......................... A61F 2/82 623/1.15 |

FOREIGN PATENT DOCUMENTS

| | | |
|---|---|---|
| EP | 2 011 562 A1 | 1/2009 |
| FR | 2770156 A1 | 4/1999 |
| GB | 1 526 322 A | 9/1978 |
| GB | 2 202 552 A | 9/1988 |
| GB | 2 217 732 A | 11/1989 |
| WO | 2007/070939 A1 | 6/2007 |
| WO | 2009/109016 A1 | 9/2009 |
| WO | 2013/156502 A1 | 10/2013 |
| WO | 2014/070243 A1 | 5/2014 |
| WO | 2015/157816 A1 | 10/2015 |

OTHER PUBLICATIONS

Capel, A. et al., "Design and additive manufacture for flow chemistry", Lab Chip, 12: 4583-4590 (2013).
Economou, D. et al., "Two-Phase Mass Transfer in Channel Electrolyzers with Gas-Liquid Flow", J. Electrochemical Society, 132(3): 601-608 (1985).
Elias, Y. et al., "A porous structured reactor for hydrogenation reactions", Chemical Engineering and Processing, 95: 175-185 (2015).
Ghanem, A. et al., "Static mixers: Mechanisms, applications, and characterization methods—A review", Chemical Engineering Research and Design, 92: 205-228 (2014).
Jardini, A. et al., "Nanocomposite Microreactor Fabricated by Indirect 3D Printing", 11 Int'l Conference on Advanced Materials, 2 pgs (2009), retrieved from internet Aug. 6, 2016.
Thakur, R. et al., "Static Mixers in the Process Industries—A Review", Trans IChemE, 81(A): 787-826 (2003).
Wang, F. et al., "Characteristic of cold sprayed catalytic coating for hydrogen production through fuel reforming", Int'l Journal of Hydrogen Energy, 35: 8206-8215 (2010).

* cited by examiner

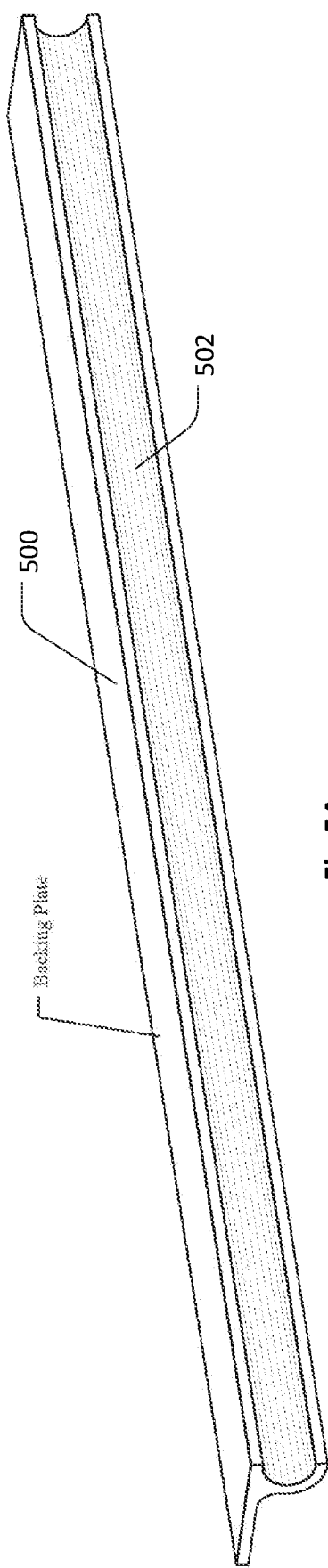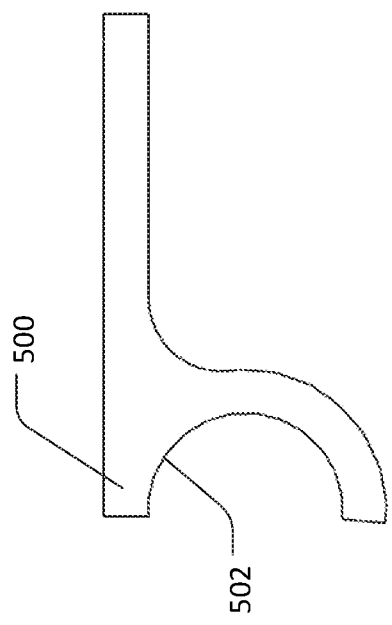
Fig.5A
Fig.5B

ROTARY DEVICE

CROSS-REFERENCE TO RELATED APPLICATIONS

This application is a National Stage Application of PCT/AU2016/051266 filed on 21 Dec. 2016, which claims priority from Australian Provisional Patent Application No 2015905354 filed on 23 Dec. 2015, and Australian Provisional Patent Application No 2016903998 filed on 3 Oct. 2016, the contents of which are incorporated herein by reference. To the extent appropriate, a claim of priority is made to each of the above-disclosed applications.

TECHNICAL FIELD

The present disclosure relates to apparatuses and systems for holding a workpiece while one or more operations are performed on the workpiece, as well as processes involving holding a workpiece while one or more operations are performed on the workpiece. The embodiments described herein may be particularly suited to holding brittle, delicate or fragile workpieces during cold spraying processes, for example.

BACKGROUND

When performing operations on elongate workpieces that are rotated during performance of the operations, the workpiece is typically mounted or held between two points under compression in a device such as a lathe, for example. The workpiece may be clamped at one or both ends to rotatable couplers such as chucks which hold the workpiece firmly in position while allowing for, or in some cases driving, rotation of the workpiece with the couplers.

However, in some cases, the compressive force required to hold the workpiece in position may break, bend, buckle or otherwise damage the workpiece.

It is desired to address or ameliorate one or more shortcomings or disadvantages associated with existing apparatuses and systems for holding a workpiece, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to an apparatus for holding a workpiece under tension while one or more operations are performed on the workpiece, the apparatus comprising: a frame; a first spindle rotatably coupled to the frame; a first coupler configured to couple the first spindle to a first end of the workpiece; a second spindle rotatably coupled to the frame; and a second coupler configured to couple the second spindle to a second end of the workpiece; wherein a distance between the first and second couplers is adjustable to hold workpiece under tension between the couplers while the one or more operations are performed, and wherein the workpiece can be rotated with the couplers relative to the frame about a common axis of rotation extending between the couplers.

The first and second spindles may be configured for co-rotation with each other. The apparatus may further comprise a first motor configured to rotate the first spindle. In some embodiments, rotation of the first motor may also cause rotation of the second spindle. In other embodiments, the apparatus may further comprise a second motor configured to rotate the second spindle.

In some embodiments, the apparatus may further comprise a tension adjustment actuator configured to adjust the tension applied to the workpiece by adjusting the distance between the first and second couplers. The tension applied to the workpiece will vary between applications, and may be in the range of about 10 N to 500 N, about 20 N to 300 N, about 30 N to 300 N, about 50 N to 200 N, or about 60 N to 100 N.

In some embodiments, one or both of the couplers may comprise a flexible coupler, such as a spring coupler, for example, to provide rotational flexibility between the workpiece and one or both of the spindles. The torsional stiffness of the or each flexible coupler may be in the range of about 10 N.m/rad to 500 N.m/rad, about 20 N.m/rad to 200 N.m/rad, or about 30 N.m/rad to 100 N.m/rad. In some embodiments, one or both of the couplers may comprise a flexible coupler, such as a spring coupler, for example, to provide longitudinal or axial flexibility between the workpiece and one or both of the spindles. The axial stiffness of the or each flexible coupler may be in the range of about 0.01 N/m to 1 N/m, about 0.05 N/m to 0.5 N/m, about 0.05 N/m to 0.25 N/m, or about 0.05 N/m to 0.15 N/m.

In some embodiments, the couplers may configured to support the workpiece while it is coated using a cold spraying process. The apparatus may further comprise a backing plate disposed on one side of the workpiece and configured to assist in supporting the workpiece during cold spraying. The backing plate may define a concave surface configured to at least partially surround one side of the workpiece. For example, the concave surface may define a concave channel within which the workpiece, extends and within which the workpiece is at least partially received when mounted for rotation. The apparatus, couplers and/or backing plate may be particularly configured to support elongate static mixer elements during cold spraying.

In some embodiments, the apparatus may further comprise one or more shielding plates to shield one or more components of the apparatus from cold spraying.

In some embodiments, the apparatus may further comprise a cold spray device and a cold spray support frame with a mechanism configured to move a nozzle of the cold spray device along an axis substantially parallel to the axis of rotation of the workpiece to cold spray the workpiece. A standoff distance between the cold spray nozzle and the workpiece may be adjustable. A lateral position of the cold spray nozzle may be adjustable in a direction perpendicular to the standoff distance and the axis of rotation of the workpiece. The cold spray support frame mechanism may comprise one or more actuators to affect and control movement of the cold spray nozzle in one, two or three spatial dimensions, such as parallel to the axis of rotation of the workpiece, parallel to a central spray axis of the cold spray nozzle, or in a lateral direction perpendicular to both the central spray axis and the axis of rotation of the workpiece.

In some embodiments, the apparatus may further comprise a tension meter configured to measure the tension applied to the workpiece. The tension meter may be coupled to any one or more of the frame, spindles, and couplers, and may be configured to be directly coupled to the workpiece.

Some embodiments relate to a system for holding a workpiece under tension and controlling rotation of the workpiece while one or more operations are performed on the workpiece, the system comprising: an apparatus according to any one of the embodiments described herein; and a controller configured to control the rotation of the workpiece.

In some embodiments, the controller may be configured to control one or more motors to affect and control rotation of the workpiece. In some embodiments, the system may be configured for controlling cold spraying of the workpiece.

In some embodiments, the controller may be further configured to control the tension adjustment actuator to adjust the tension applied to the workpiece. In some embodiments, the controller may be configured to control the tension adjustment actuator to adjust the tension applied to the workpiece to a selected tension, in response to receiving a signal from the tension meter, until the selected tension is achieved.

In some embodiments, the controller may be further configured to control one or more actuators associated with the mechanism of the cold spray support frame to control movement of the cold spray nozzle relative to the workpiece. The controller may be configured to control the actuators to control movement of the cold spray nozzle in one, two or three spatial dimensions, such as parallel to the axis of rotation of the workpiece, parallel to a central spray axis of the cold spray nozzle, or in a lateral direction perpendicular to both the central spray axis and the axis of rotation of the workpiece.

In some embodiments, the apparatus may further comprise a first motor configured to rotate the first spindle and a second motor configured to rotate the second spindle, and the controller may be configured to operate the first and second motors substantially synchronously to affect substantially simultaneous co-rotation of the first and second spindles.

The system may further comprise a computer processor configured to execute software stored on memory accessible to the processor to provide a user interface to allow a user to provide input to be transmitted to the controller to control one or more operations of the apparatus.

Some embodiments relate to a process comprising: rotating a workpiece held under tension; and performing one or more operations on the workpiece, Some embodiments relate to a process comprising: mounting a workpiece between two couplers; adjusting a distance between the two couplers to apply tension to the workpiece; rotating the workpiece; and performing one or more operations on the workpiece while the workpiece is held between the two couplers under tension.

In some embodiments, mounting the workpiece may comprise mounting the workpiece in an apparatus according to any one of the described embodiments. In some embodiments, the process may comprise using a system according to any one of the described embodiments to perform at least part of the process.

Rotating the workpiece may comprise rotating the workpiece to a selected angle and subsequently performing one or more operations on the workpiece, or rotating the workpiece continuously while performing one or more operations on the workpiece. The rate of rotation of the workpiece may be varied for different applications, and may be in the range of about 1 rpm to about 2000 rpm, about 10 rpm to about 1000 rpm, or about 50 rpm to about 500 rpm.

In some embodiments, the process may further comprise progressively ramping up the rate of rotation of the workpiece to a selected continuous rotation rate. The magnitude of angular acceleration of the workpiece may be kept below a particular value of angular acceleration to avoid applying excessive torsional forces to the workpiece. For example, the magnitude of angular acceleration of the workpiece may be kept below about 300 rad.s$^{-2}$, below about 100 rad.s$^{-2}$, below about 50 rad.s$^{-2}$, below about 10 rad.s$^{-2}$, below about 5 rad.s$^{-2}$, below about 1 rad.s$^{-2}$, or below about 0.1 rad.s$^{-2}$. In some embodiments, the magnitude of angular acceleration of the workpiece may be kept within a range of about 0.05 rad.s$^{-2}$ to 25 rad.s$^{-2}$, for example.

In some embodiments, there may be removable end portions at each end of the workpiece to be held by the couplers. In some embodiments, the workpiece, may comprise a plurality of workpiece elements (each of which may be considered to be a workpiece in its own right) coupled together end to end by joiner couplers. The joiner couplers may be integrally formed with the workpiece elements. The joiner couplers may be configured to be removable from the workpiece elements. For example, the joiner couplers may be separable from the workpiece elements at pre-formed points or areas of weakness.

In some embodiments, the workpiece may comprise any one or more of: an elongate object, a delicate object, a fragile object, a brittle object, a 3D printed object, a porous object, a static mixer, or a series of concatenated static mixer elements joined end on end.

In some embodiments, the one or more operations may comprise any one or more of: coating, painting, spray painting, surface treating, heat treating, polishing, sand blasting, or cold spraying.

In some embodiments, the process may comprise cold spraying the workpiece using any one or more of: high pressure cold spraying, low pressure cold spraying, kinetic metallisation, pulsed gas dynamic spraying, and vacuum cold spraying.

In some embodiments, the process may comprise cold spraying the workpiece with cold spray particles comprising at least one of a metal, metal alloy, cermet and metal oxide. For example, the cold spray particles may comprise a catalytic material selected from at least one of iron, aluminium, cobalt, copper, zinc, nickel, palladium, platinum, gold, silver, ruthenium, iridium, rhodium, titanium vanadium, zirconium, niobium, tantalum, and chromium, or a metal alloy, cermet or metal oxide thereof. In some embodiments, the cold spraying may be controlled to form a rough or porous deposition layer on a surface of the workpiece.

In some embodiments, the process may comprise causing the workpiece to rotate while simultaneously causing a cold spray nozzle to move along an axis substantially parallel to an axis of rotation of the workpiece to coat at least part of the workpiece.

BRIEF DESCRIPTION OF DRAWINGS

Exemplary embodiments will now be described in detail with respect to the drawings, in which:

FIG. 5A is a perspective view of a backing plate, according to some embodiments;

FIG. 5B is a cross-sectional view of the backing plate of FIG. 5A;

DESCRIPTION OF EMBODIMENTS

Embodiments generally relate to apparatuses and systems for holding a workpiece while one or more operations are performed on the workpiece, as well as processes involving holding a workpiece while one or more operations are performed on the workpiece. The embodiments described herein may be particularly suited to holding brittle, delicate or fragile workpieces during cold spraying processes, for example.

Figure 1:
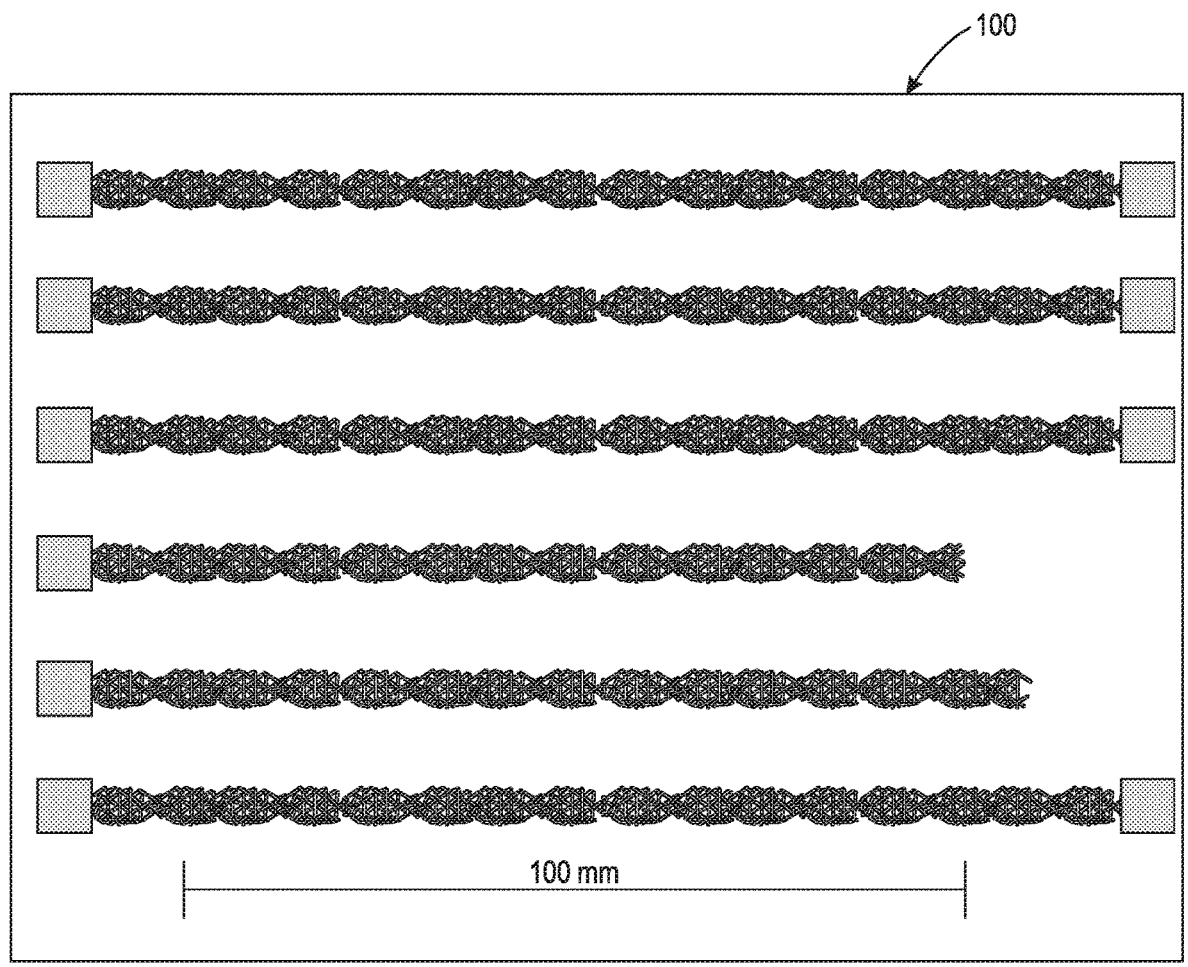
FIG. 1 shows some examples of 3D printed static mixers.
Figure 2:
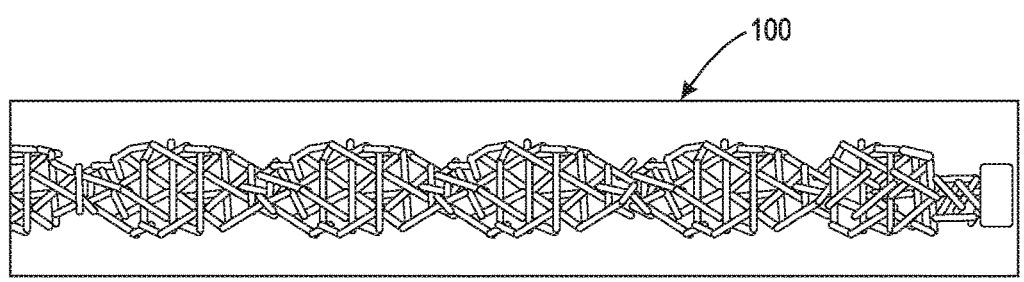
FIG. 2 shows a further example of a 3D printed static mixer.

As described in the related applications cross-referenced above, static mixers for continuous flow chemical reactors can be designed with complex geometries to promote mixing of one or more fluids. The advent of additive manufacturing and 3D printing has allowed for the design and manufacture of static mixers defining different geometries that may otherwise be difficult or impossible to produce. Some exemplary static mixers are shown in FIGS. 1 and 2 and 9.

The cross-referenced applications also describe coating static mixers with a catalytic material to provide efficient catalytic reaction of reactants in continuous flow chemical reactors, and one method for applying such a coating is by cold spraying the catalytic material onto the surfaces of the static mixers.

Cold spray coating techniques generally involve accelerating solid particles to supersonic velocities through a cold spray nozzle (see FIG. 3) to achieve ballistic impingement on the surface of a substrate such that the particles adhere to and coat the surface forming a deposition layer of material. Various metal powders may be used for cold spraying onto a surface, and there are a number of different types of cold spraying methods and systems including high pressure cold spray, low pressure cold spray, kinetic metallisation, pulsed gas dynamic spraying, and vacuum cold spray, for example. The particles and/or gas may or may not be preheated, but the temperature of the particles generally remains below the melting point of the particles. The particles may be accelerated to speeds in the range of 300 ms$^{-1}$ to 1400 ms$^{-1}$ and when they impinge on the surface, the particles plastically deform and bond to the surface.

Figure 3:
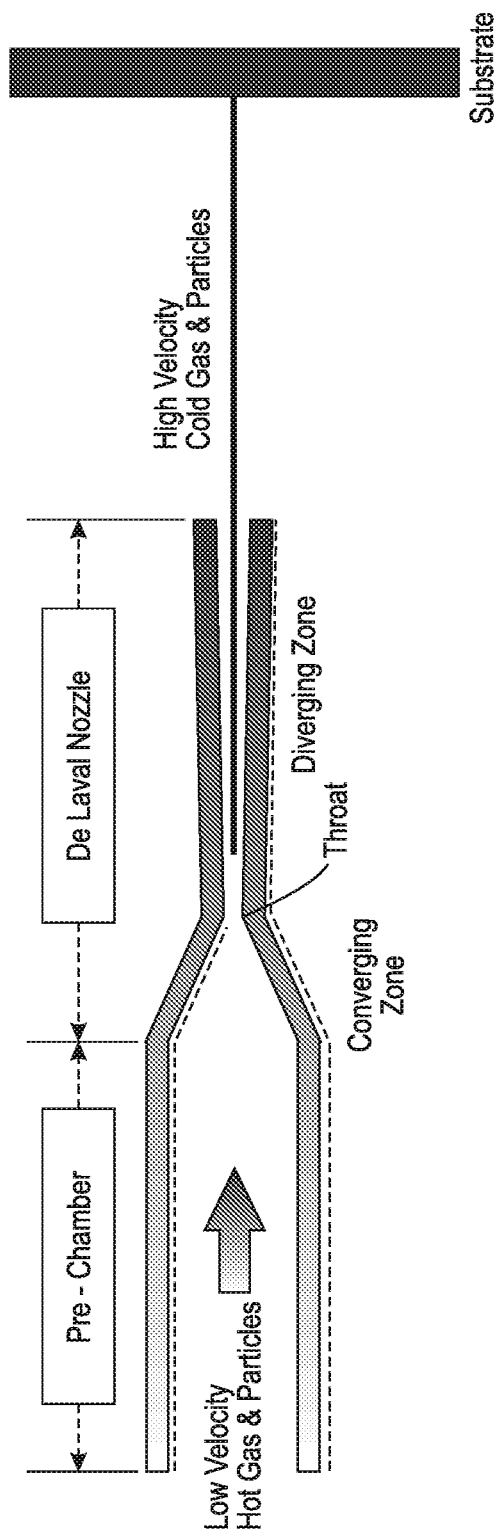
FIG. 3 is a schematic diagram of a cold spray nozzle and spray impinging on a surface of a substrate.

The particles may be accelerated by feeding them through a converging-diverging nozzle with pressurised gas from a high pressure side of the nozzle to a low pressure side of the nozzle, thereby forming a supersonic gas jet with a stream of supersonic solid particles. In some cases, the solid, particles may be fed into the gas jet on the low pressure side of the nozzle. The nozzle may be in the form of a de Laval nozzle as shown in FIG. 3.

Cold spray techniques typically result in a dense layer of material forming on the surface of the substrate. However, if the cold spray conditions are carefully controlled a rough or porous coating suitable for catalysis can be formed on a suitable substrate such as a static mixer scaffold. The increased roughness may enhance micro-scale turbulent mixing of the fluidic reactants near the surface of the catalytic layer, and may provide a larger surface area of catalytic material on which catalytic reactions can occur. In some applications, it may be preferable to deposit the catalytic material on the scaffold in order to form a more porous catalytic layer, or a catalytic layer with increased roughness compared to that achieved using electro-deposition or other deposition techniques.

One important consideration with cold spraying a surface is the significant force of the impinging jet of gas and spray particles on the object, against which the object must be sufficiently supported. Another important consideration is that there must be a direct line of sight from the cold spray nozzle to the surface, and the angular spread of effective cold spray adhesion is typically less than about 15° deviation from a central axis of the spray. Therefore, for complete coverage, most objects will need to be sprayed from multiple different angles by moving the cold spray nozzle to different positions and/or rotating the object itself.

This could be done by fixedly mounting the object or workpiece in a clamp or holding jig, cold spraying one side of the workpiece, then dismounting the workpiece, remounting the workpiece in a different orientation to cold spray another and repeating the process until the desired coating coverage is achieved. However, remounting a workpiece multiple times is very time consuming.

Another possibility is to mount the workpiece between two couplers or chucks of a lathe to simplify the rotation of the workpiece or to allow for continuous rotation of the workpiece during cold spraying. Some workpieces may be held at one end only, in a single chuck, but others must be held at both ends to be sufficiently supported while operations are performed on them. Elongate workpieces are typically mounted in lathes under compression when such support is required. However, the compressive force required to support brittle, delicate or fragile workpieces against processing forces, such as the forces associated with cold spraying, may break, bend, deform, fracture or otherwise damage the workpiece.

When performing operations such as cold spraying on fragile, brittle or delicate workpieces which are stronger in tension than in compression, this problem may be addressed by holding the workpiece in tension rather than applying a longitudinal compressive load to it.

Furthermore, holding such a workpiece under tension in a way which allows for continuous or stepped rotation of the workpiece avoids the need for remounting the workpiece between cold spraying operations.

Referring to FIGS. 1 and 2, a number of exemplary workpieces 100 are shown. The workpieces 100 shown in FIGS. 1 and 2 are static mixers, which were produced using additive manufacturing or 3D printing. Due to their size and geometry, these static mixers are too delicate, and particularly too brittle, to be mounted in a conventional lathe under compression.

As discussed above, static mixers may be coated with a catalytic material to promote efficient catalytic reactions in a chemical flow reactor. One method for depositing a catalytic material on the surface of a static mixer is by cold spraying.

Referring to FIG. 3, a schematic diagram is shown illustrating part of an exemplary cold spray device 300 comprising a pre-chamber 302 into which cold spray particles and pressurised gas are fed, and a cold spray nozzle 310 coupled to the pre-chamber 302. The nozzle 310 shown in FIG. 3 is in the form of a De Laval nozzle comprising a converging zone 312, a throat 314 and a diverging zone 316. The nozzle 310 is configured such that the pressurised gas and cold spray particles are accelerated as they flow from the pre-chamber 302 through the nozzle 310 and are then propelled or sprayed generally along a central spray axis 320 to impinge on a surface of a substrate 330, such as a workpiece 100. At least some of the cold spray particles are accelerated to a velocity at which they undergo plastic deformation on impacting the surface and bond to the surface forming a deposition layer on the surface.

Figure 4:
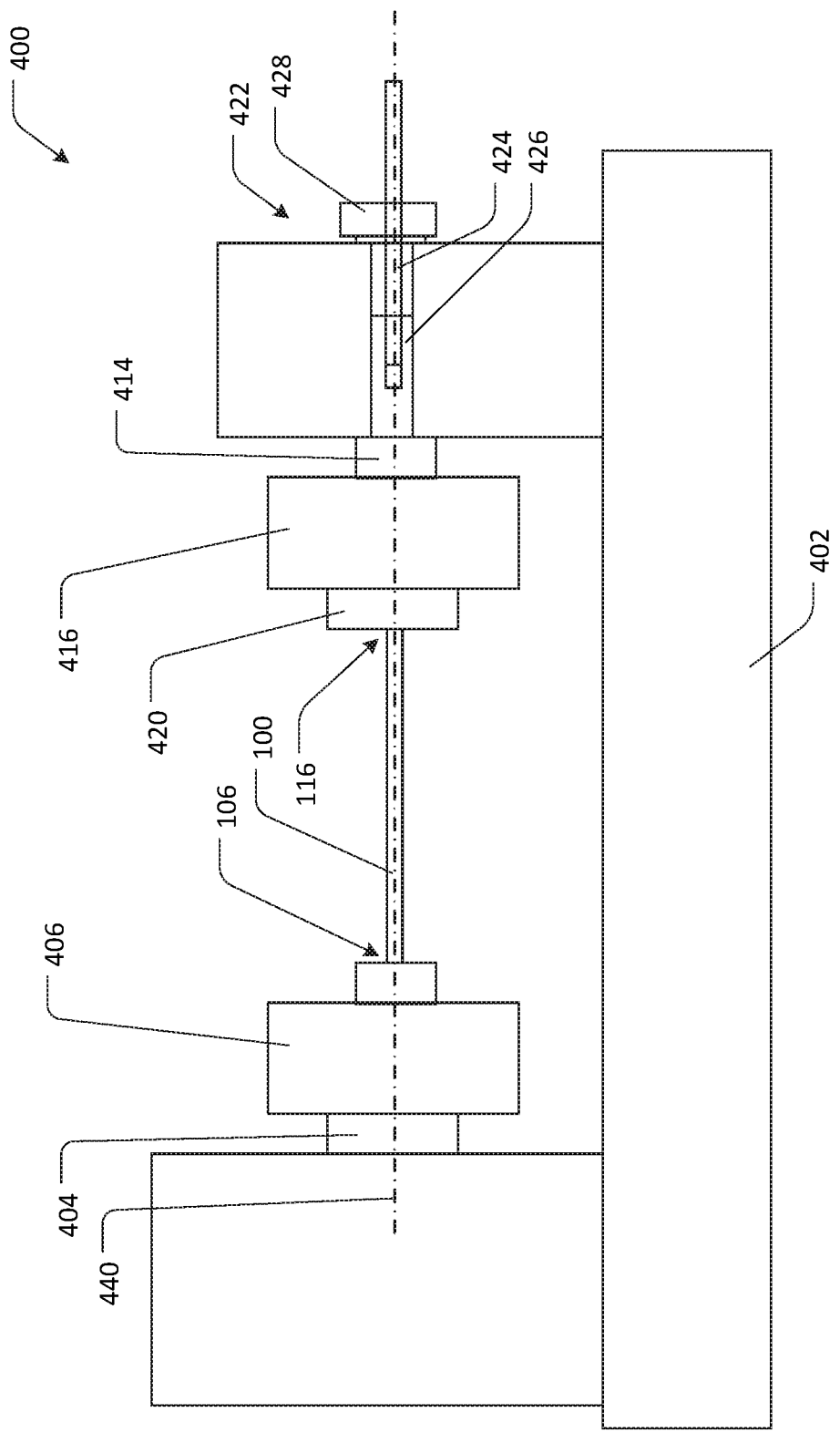
FIG. 4 is a schematic diagram of a workpiece mounted in an apparatus, according to some embodiments.

Referring to FIG. 4, an apparatus 400 for holding a workpiece 100 under tension while one or more operations are performed on the workpiece 100, is shown, according to some embodiments. The apparatus 400 comprises; a frame 402; a first spindle 404 rotatably coupled to the frame 402; a first coupler 406 configured to couple the first spindle 404 to a first end 106 of the workpiece 100; a second spindle 414 rotatably coupled to the frame 402; and a second coupler 416 configured to couple the second spindle 414 to a second end 116 of the workpiece 100.

The spindles 404, 414 may each comprise one or more components, such as a drive shaft, a chuck and/or one or more bearings, for example. The spindles 404, 414 may be directly or indirectly coupled to the frame 402, and may be coupled to the frame 402 via one or more other components or mechanisms. The spindles 404, 414 may generally be limited to one degree of rotational freedom relative to the frame 402 about a common axis of rotation, but may also be configured for axial and/or lateral position adjustment in some embodiments.

The couplers 406, 416 may each comprise one or more components, such as flexible couplers, for example. The couplers 406, 416 may be directly or indirectly coupled to the frame spindles 404, 414 and may be coupled to the spindles 404, 414 or the workpiece via one or more other components or mechanisms. In some embodiments, the apparatus may comprise a tension meter 420 configured to measure the tension applied to the workpiece 100. The tension meter 420 may be disposed between any two components between the first and second spindles 404, 414, or in some embodiments, may be disposed on one of the components. For example, the tension meter 420 may comprise a strain gauge fixed to a surface of one of the spindles 404, 414 or couplers 406, 416.

The couplers 406, 416 may generally be limited to one degree of rotational freedom relative to the frame 402 about a common axis of rotation with the spindles, but may also be configured for axial and/or lateral position adjustment in some embodiments. For example, part of one or both couplers 406, 416 may be axially adjustable relative to the spindles 404, 414 to allow adjustment of the tension applied to the workpiece 100. In some embodiments, couplers 406, 416 may comprise flexible couplers to allow for some degree of axial, rotational, lateral or angular deflection or movement of the workpiece 100 relative to the spindles 404, 414, to facilitate holding the workpiece under tension, to compensate for misalignments between the spindles 404, 414 or to reduce the effects of vibrations or sudden accelerations on the workpiece 100.

A distance between the first and second couplers 406, 416 is adjustable to hold the workpiece 100 under tension between the couplers 406, 416 while the one or more operations are performed. That is, the couplers 406, 416 are configured to hold the ends 106, 116 of the workpiece 100 (once mounted) and apply opposing forces to the workpiece 100 in opposing directions away from one another. The workpiece 100 can be rotated with the couplers 406, 416 relative to the frame 402 about a common axis of rotation 440 extending between the couplers 406, 416.

The apparatus 400 may comprise a tension adjustment actuator 422 configured to adjust the tension applied to the workpiece 100 by adjusting the distance between the first and second couplers 406, 416. The tension adjustment actuator 422 shown in FIG. 4 comprises a threaded rod 424 coupled to the second spindle 414 via a bearing 426 to allow rotation of the spindle 414 relative to the threaded rod 424. The threaded rod 424 is threadedly engaged with a threaded hand wheel 428 which abuts part of the frame 402, such that turning the hand wheel 428 adjusts an axial position of the threaded rod 424 together with the second spindle 414 relative to the first spindle 404 and the frame 402, thereby adjusting the distance between the couplers 406, 416 and the tension applied to the workpiece 100.

In some embodiments, one of the spindles 404, 414 such as the first spindle 404 may be driven by a motor 708 (FIG. 7A) while the other one of the spindles 404, 414 such as the second spindle 414, may be free to rotate with the couplers 406, 416, workpiece 100 and first spindle 404. This arrangement may be suitable for relatively stronger workpieces 100 and/or low angular accelerations. However, for particularly delicate workpieces 100 and/or higher angular accelerations, the rotational inertia and changes in angular momentum of the second spindle 414 and second coupler 416 may break or damage the workpiece 100.

In order to avoid this issue, the first and second spindles 404, 414 may be configured for co-rotation with each other. That is, any rotation of the spindles 404, 414 may be controlled to be simultaneous. This may be achieved by mechanically coupling the spindles 404, 414 to each other independently of the workpiece 100, such as via a parallel shaft and gear system, for example. In such embodiments, rotation of the first motor 708 may also cause rotation of the second spindle 414.

Alternatively, in other embodiments, the apparatus 400 may further comprise a second motor 718 (FIG. 7A) configured to rotate the second spindle 414. The two motors 708, 718 may be configured to drive rotation of the spindles 404, 414 independently, and may be controlled to cause synchronous co-rotation of the spindles 404, 414, i.e., with any rotations of the spindles 404, 414 occurring substantially simultaneously and with substantially equal angular positions, rates and accelerations.

As discussed above, cold spraying involves high velocities and in some cases, the aerodynamic forces on the workpiece 100 may be high enough to break, bend, deform, fracture or otherwise damage the workpiece 100, Therefore, in some embodiments, the apparatus 400 may further comprise a backing plate 500 disposed on one side of the workpiece 100 and configured to assist in supporting the workpiece 100 during cold spraying.

Figure 6:
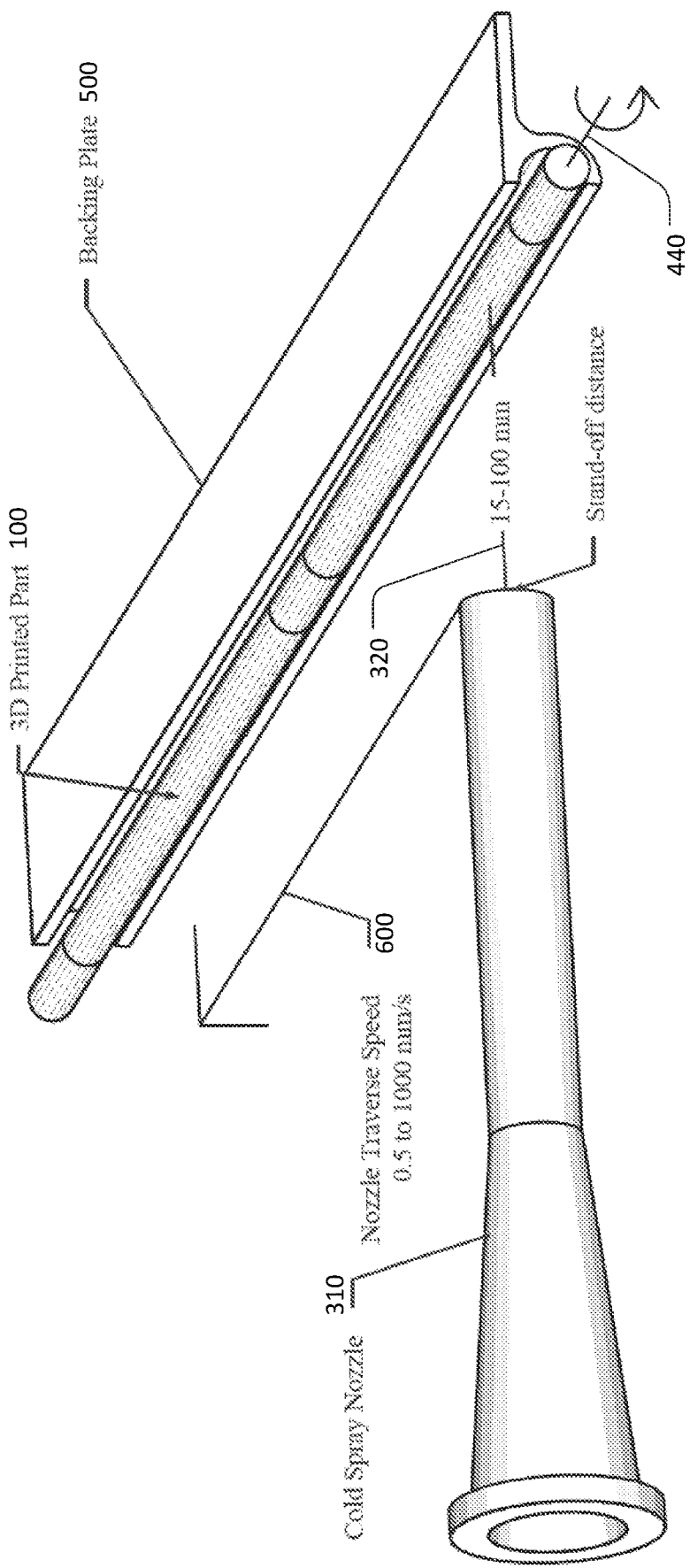
FIG. 6 is a perspective view of a cold spray nozzle, workpiece and backing plate illustrating a cold spraying arrangement, according to some embodiments.

Referring to FIGS. 5A and 5B, a backing plate 500 is shown according to some embodiments. The backing plate 500 may be arranged behind the workpiece 100 relative to a cold spray nozzle 310, as shown in FIG. 6, to reduce the aerodynamic forces placed on the workpiece 100 by reducing the low pressure region in the wake of the workpiece 100. In some embodiments, the backing plate 500 and workpiece 100 may be arranged with a small gap therebetween. In cases where the workpiece 100 flexes a small amount due to the cold spraying forces, part of the workpiece 100 may contact and be further supported by the backing plate 500. In some embodiments, the workpiece 100 may be arranged to be in contact with the backing plate 100 along at least part of the length of the workpiece 100 in order to provide further support.

The backing plate 500 may define a concave surface 502 configured to at least partially surround one side of the workpiece 100. This arrangement may provide further support and stability to the workpiece 100 to mitigate against deflections of the workpiece 100 due to aerodynamic oscillations or a misalignment between the central spray axis 320 and the axis of rotation 440 of the workpiece 100. The surface 502 may be polished or coated with a non-stick film to reduce friction between the hacking plate 500 and the workpiece 100 when in contact. The backing plate 500 shown in the drawings is particularly suited for elongate workpieces 100 but may define a different geometry for differently shaped workpieces 100.

Referring to FIG. 6, an arrangement of the cold spray nozzle 310, workpiece 100 and backing plate 500 is shown according to some embodiments. The workpiece 100 is shown as a 3D printed part, but could comprise any workpiece 100 to be cold sprayed as discussed above. The cold spraying process may comprise moving the cold spray nozzle 310 at least along one side of the workpiece 100 in a direction 600 which is substantially parallel to the axis of rotation 440 of the workpiece 100. The traverse speed of the nozzle 310 may be different for different applications, and could be in the range of about 0.5 mm/s to 1000 mm/s, for example.

The nozzle may typically be oriented with the central spray axis 320 substantially perpendicular to the axis of rotation 440 of the workpiece 100, but it may not be in some embodiments. A standoff distance between the nozzle 310 and the workpiece may be in the range of about 1 mm to 200 mm, for example about 15 mm to 100 mm, and may be adjustable in some embodiments.

In some embodiments, the workpiece 100 may be rotated to a selected angle, cold sprayed at that angle, rotated to a new selected angle, and cold sprayed again. This process may be repeated for a number of different selected angles as required to provide the desired coverage of the coating on the workpiece 100.

In some embodiments, the workpiece 100 may be rotated continuously while the cold spray nozzle 310 is moved along the workpiece 100 in the direction 600 shown in FIG. 6 while cold spraying the workpiece 100.

Figure 7A:
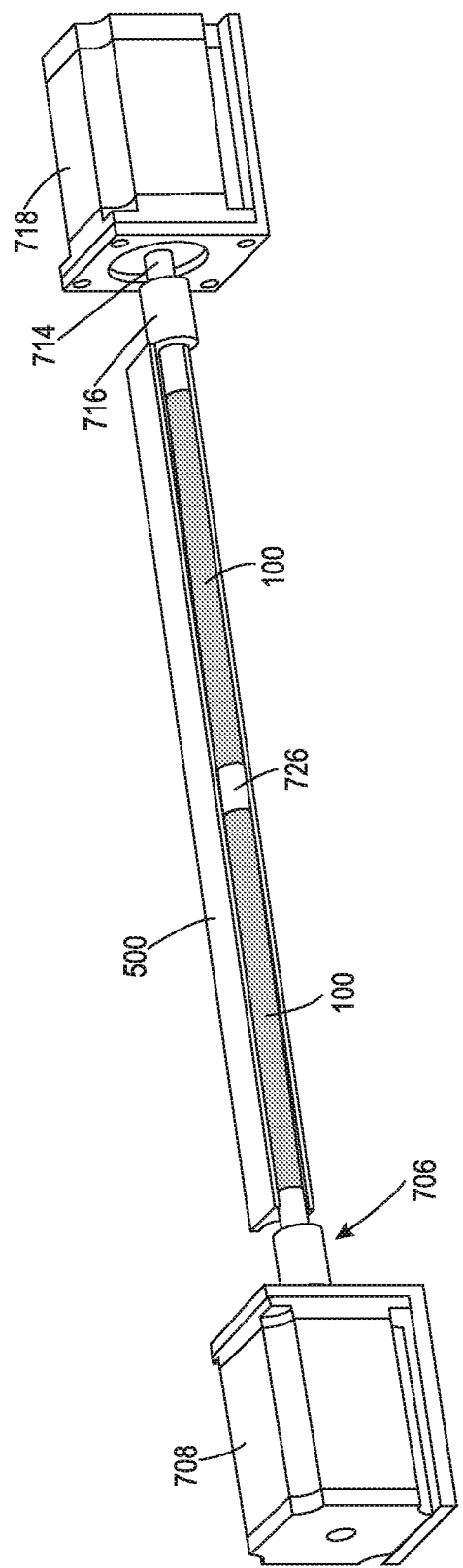
FIG. 7A is a perspective of a workpiece mounted in an apparatus, according to some embodiments.
Figure 7B:
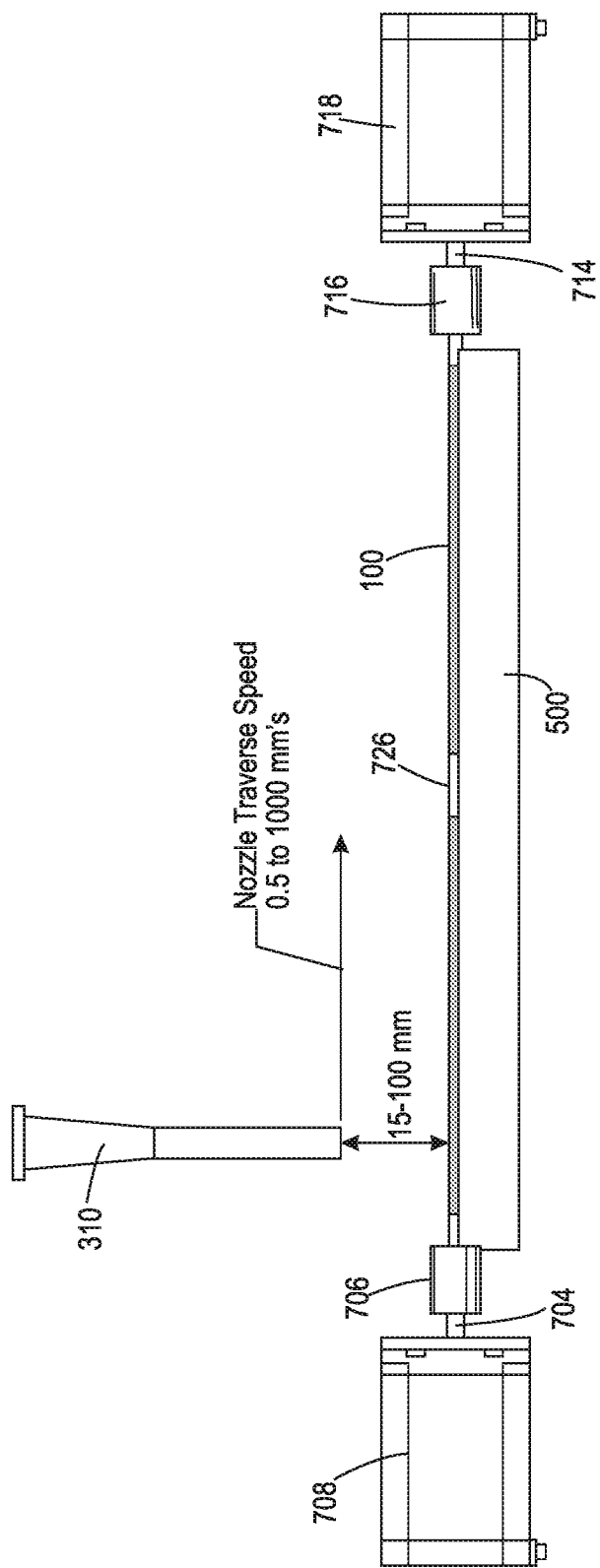
FIG. 7B is a plan view of the workpiece and apparatus of FIG. 7A further illustrating a cold spraying arrangement according to some embodiments.
Figure 7C:
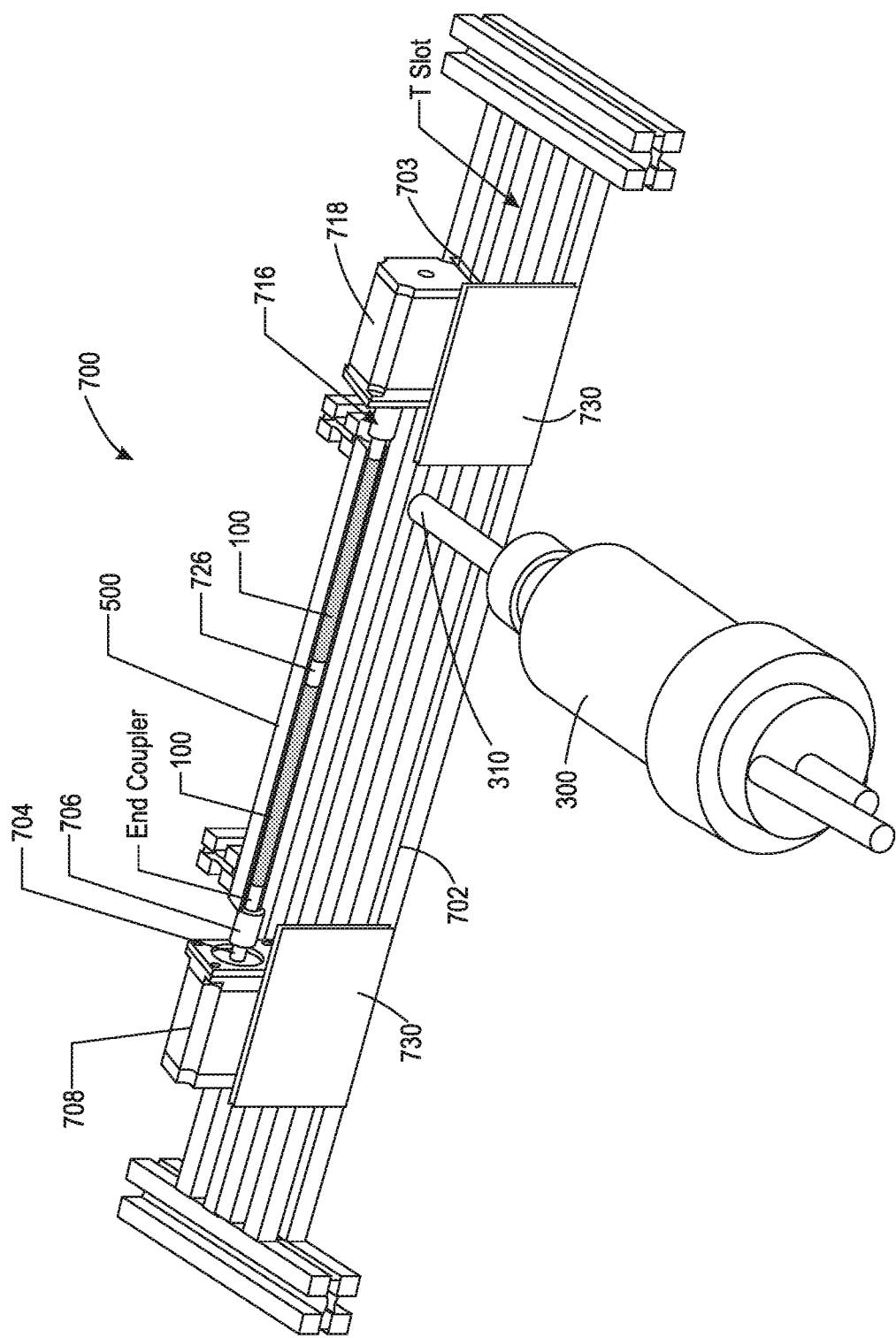
FIG. 7C is a perspective view of the cold spraying arrangement of 7B showing further features of the apparatus of FIG. 7A, according to some embodiments.

Referring to FIGS. 7A to 7C, an apparatus 700 for holding a workpiece 100 under tension while one or more operations are performed on the workpiece 700, is shown, according to some embodiments. Similar components are indicated with similar reference numerals and may include similar features, as described in relation to FIG. 4.

The apparatus 700 comprises: a frame 702 (see FIG. 7C); a first spindle 704 rotatably coupled to the frame 702; a first coupler 706 configured to couple the first spindle 704 to a first end 106 of the workpiece 100; a second spindle 714 rotatably coupled to the frame 702; and a second coupler 716 configured to couple the second spindle 714 to a second end 116 of the workpiece 100.

The apparatus 700 further comprises a first motor 708 configured to rotate the first spindle 704 and a second motor 718 configured to rotate the second spindle 714. The motors 708, 718 may comprise stepper motors to allow the workpiece 100 to be rotated to a particular selected angle. In the apparatus 700 shown in FIGS. 7A to 7C, the spindles 704, 714 comprise the drive shafts of the motors 708, 718. However, in other embodiments, the spindles 704, 714 may be separate from and mechanically coupled to the drive shafts of the motors 708, 718. The motors 708, 718 may be configured for synchronous operation to affect co-rotation of the spindles 704, 714 as discussed above.

A distance between the first and second couplers 706, 716 is adjustable to hold the workpiece 100 under tension between the couplers 706, 716 while the one or more operations are performed, and the workpiece 100 can be rotated with the couplers 706, 716 relative to the frame 702 about a common axis of rotation extending between the couplers 706, 716.

The apparatus 700 may comprise a tension adjustment actuator 1222 (FIG. 12) configured to adjust the tension applied to the workpiece 100 by adjusting the distance between the first and second couplers 706, 716. The tension adjustment actuator 1222 may be configured to adjust an axial position of one of the couplers 706, 716 with respect to the spindles 704, 714; or to adjust an axial position of one of the spindles 704, 714 with respect to the motors 708, 718; or to adjust an axial position of one of the motors 708, 718 with respect to the frame 702.

The frame 702 may comprise a track 703 allowing the position of one or both motors 708, 718 to be adjusted along the track for workpieces 100 of different lengths. Tension may be applied to the workpiece 100 by mounting the workpiece 100 in the apparatus 700 and then adjusting the position of one or both motors 708, 718 away from each other along the track 703. The tension adjustment actuator 1222 may comprise a third motor (not shown) configured to drive an adjustment mechanism such as a power screw threadedly engaged with part of a housing of one of the motors 708, 718, for example.

The couplers 706, 716 may comprise any suitable coupling mechanisms for coupling the spindles 704, 714 to the respective ends 106, 116 of the workpiece 100. For example, each coupler 706, 716 may define one or more bores configured to receive the corresponding spindle 704, 714 and/or the corresponding end 106, 116 of the workpiece 100, and comprise one or more grub screws configured to secure the spindle 704, 714 and/or workpiece 100 in the one or more bores. In other embodiments, the couplers 706, 716 may comprise other clamping mechanisms, such as a chuck, for example. In some embodiments, each of the couplers 706, 716 may comprise one or more components which cooperate to couple the workpiece 100 to the spindles 704, 714. For example, the coupler 706 shown in FIG. 10 comprises a flexible spring coupler 706a coupled to the spindle 704, and a split rod 706b configured to couple the workpiece 100 to the flexible coupler 706a.

Different couplers 706, 716 may be used for different workpieces 100. For example, some workpieces 100 may be formed with cylindrical ends 106, 116 (e.g. FIG. 1) which may be received in cylindrical bores of the couplers 706, 716. Other workpieces 100 may be formed with flat plate ends 106, 116 (e.g. FIG. 10) which may be received in a slot in the end of the coupler 706, 716 and fastened with clamping or another form of frictional engagement, such as by a grub screw, for example. In some embodiments, the ends 106, 116 of the workpiece 100 may be configured to be held by the couplers, and subsequently removed from the workpiece 100 once the one or more operations are complete.

In some embodiments, a plurality of workpieces 100 may be mounted in the apparatus 700 together, coupled to each other end on end. For example, the workpieces 100 may be joined, to each other by a joiner coupler 726. The joiner coupler 726 may comprise a hollow sleeve with grub screws configured to clamp ends 106, 116 of adjacent workpieces 100 in the sleeve.

Figure 8:
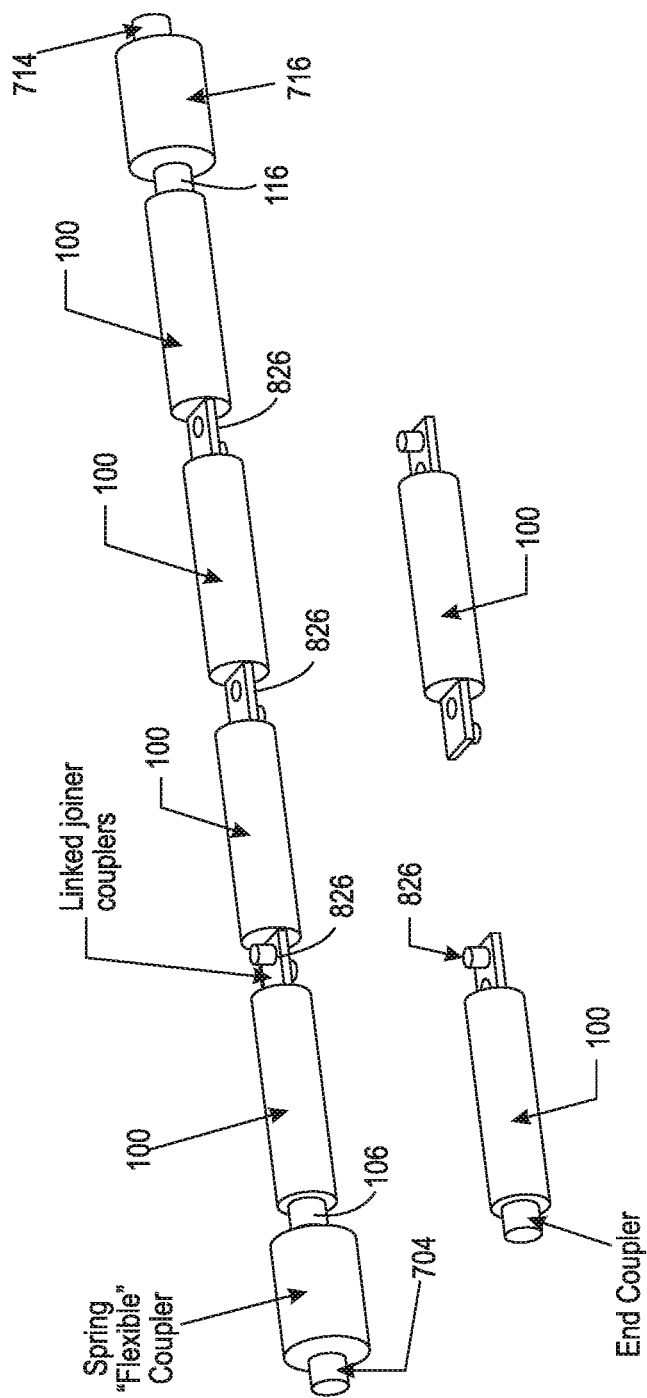
FIG. 8 is a perspective view of a plurality of workpiece elements joined together and mounted under tension between flexible couplers, according to some embodiments.

In some embodiments, the workpieces 100 themselves may be formed with ends 106, 116 configured to couple directly to each other. For example, the workpieces 100 shown in FIG. 8, define integrally formed joiner couplers 826 comprising complementary pegs and holes configured to mate with each other to couple adjacent workpieces 100 under tension. There are a number of different integral coupling portions that may be suitable, and while the workpieces 100 shown are 3D printed workpieces 100, other types of workpieces 100 could be formed with integral complementary coupling portions. In some embodiments, the ends 106, 116 of the workpiece 100 may be configured to be removed from the workpiece 100 once the one or more operations are complete.

In some embodiments, one or both of the couplers 706, 716 may be or comprise a flexible coupler such as a spring coupler to provide rotational flexibility between the workpiece 100 and one or both of the spindles 704, 714. The torsional stiffness of the or each flexible coupler may be in the range of about 10 N.m/rad to 500 N.m/rad, about 20 N.m/rad to 200 N.m/rad, or about 30 N.m/rad to 100 N.m/rad. Flexible couplers may also allow for some degree of axial, rotational, lateral or angular deflection of the workpiece 100 relative to the spindles 704, 714, for example to facilitate holding the workpiece under tension, to compensate for misalignments between the spindles 704, 714, or to reduce the effects of vibrations or sudden accelerations on the workpiece 100.

Figure 9A:
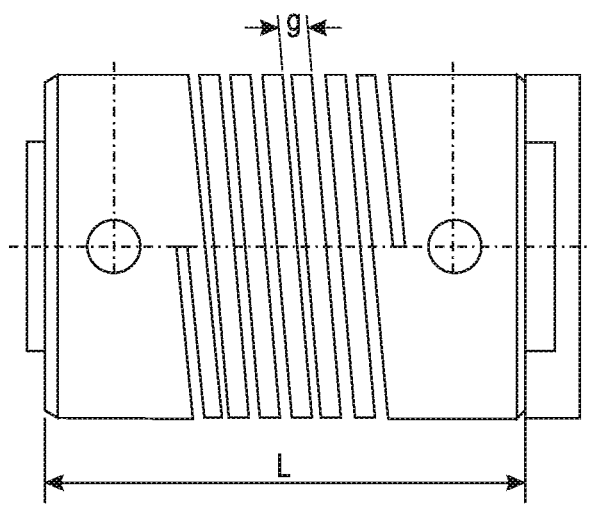
FIG. 9A is a side view of a flexible coupler, according to some embodiments.
Figure 9B:
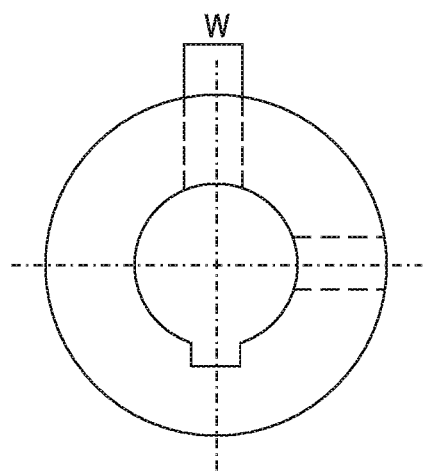
FIG. 9B is an end view of the flexible coupler of FIG. 9A.

Any suitable flexible couplers may be used, such as the DR series of flexible couplers (e.g., model DR.6.35X6,35-D18L25) supplied at oceancontrols.com.au or ibestchina.com, for example, and illustrated in FIGS. 9A and 9B. This type of coupler is defined by a hollow cylinder with a helical slot in the wall of the cylinder which forms a spring. There are bores at either end to receive the shaft of a spindle 704, 714, another coupling portion, or an end 106, 116 of the workpiece 100.

The apparatus 700 may further comprise a cold spray device 300 which may be referred to as a cold spray gun, and a cold spray support frame (not shown) with a mechanism configured to move a nozzle 310 of the cold spray device 300 along an axis substantially parallel to the axis of rotation of the workpiece 100 to cold spray the workpiece 100 as shown in FIGS. 6 and 7B. The backing plate 500 may be fixed to the support frame on one side of the workpiece 100. After a certain amount of cold spraying, a cold spray deposition layer may build up on the backing plate 500, which may impede rotation of the workpiece 100. Therefore, it may be necessary to replace the backing plate 500 occasionally.

The cold spray support frame mechanism may comprise one or more actuators to affect and control movement of the cold spray nozzle 310 in one, two or three spatial dimensions, such as parallel to the axis of rotation 440 of the workpiece 100, parallel to the central spray axis 320 of the cold spray nozzle 310, or in a lateral direction perpendicular to both the central spray axis 320 and the axis of rotation 440 of the workpiece 100. For example, the one or more actuators may comprise one or more motors configured to adjust the position of the cold spray nozzle 310 along one or more tracks in the support frame.

In some embodiments, the apparatus 700 may further comprise one or more shielding plates 730 to shield one or more components of the apparatus 700 from cold spraying. The shielding plates 730 may be fixed to the frame 702. In some embodiments, the shielding plates 730 may be held in one or more tracks in the frame 702 to allow the position of each shielding plate 730 to be adjusted to shield different components of the apparatus 700 or to move to a new shielding position when one of the components, such as a motor, is moved to a new position. Two shielding plates 730 are shown in FIG. 7C shielding the motors 708, 718, couplers 706, 716 and spindles 704, 714. However, further shielding plates 730 may be included to shield any joining couplers 726 between adjacent workpieces 100 or other components which may require shielding.

In some embodiments, the apparatus 700 may further comprise a tension meter 1:220 (FIG. 12) configured to measure the tension applied to the workpiece 100 as described in relation to apparatus 400. The tension adjustment actuator 1222 may be used to adjust the tension applied to the workpiece until a desired tension is achieved as observed using the tension meter 1220.

Figure 10:
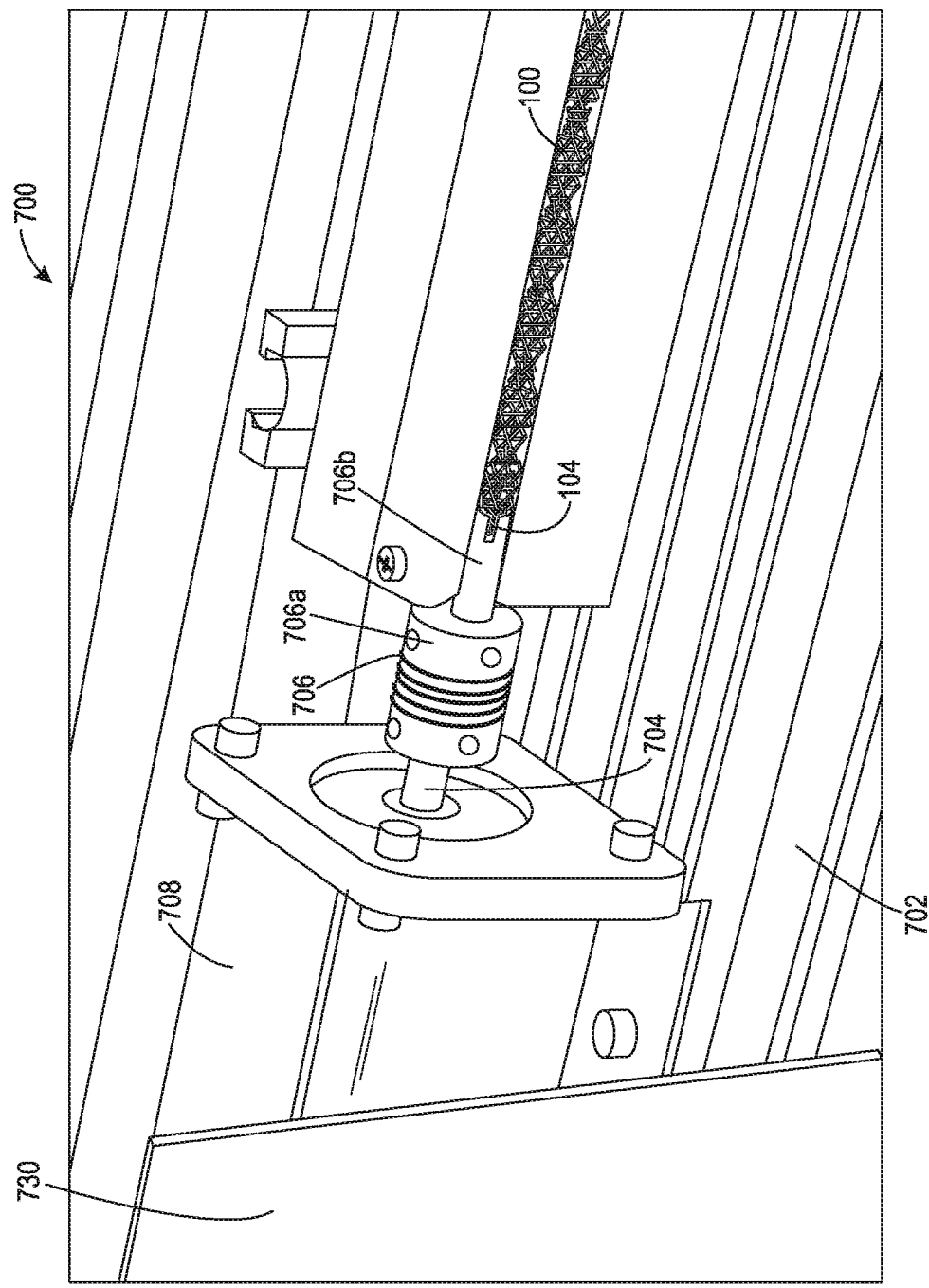
FIG. 10 is a perspective view showing part of an apparatus with a static mixer mounted in the apparatus, according to some embodiments.

Referring to FIG. 10, part of an exemplary embodiment of the apparatus 700 is shown, with a flat plate end 104 of a 3D printed static mixer 100 mounted in a slot of a coupler 706. The coupler 706 comprises a the flexible coupler 706 illustrated in FIGS. 9A and 913, and is configured to couple the end 104 of the workpiece 100 to a spindle 704 of a motor 708 mounted to a frame 702. The backing plate 500 is fixed to the frame 702 alongside the workpiece 100, and a shielding plate 730 is fixed to the frame in front of the motor 708.

Figure 11:
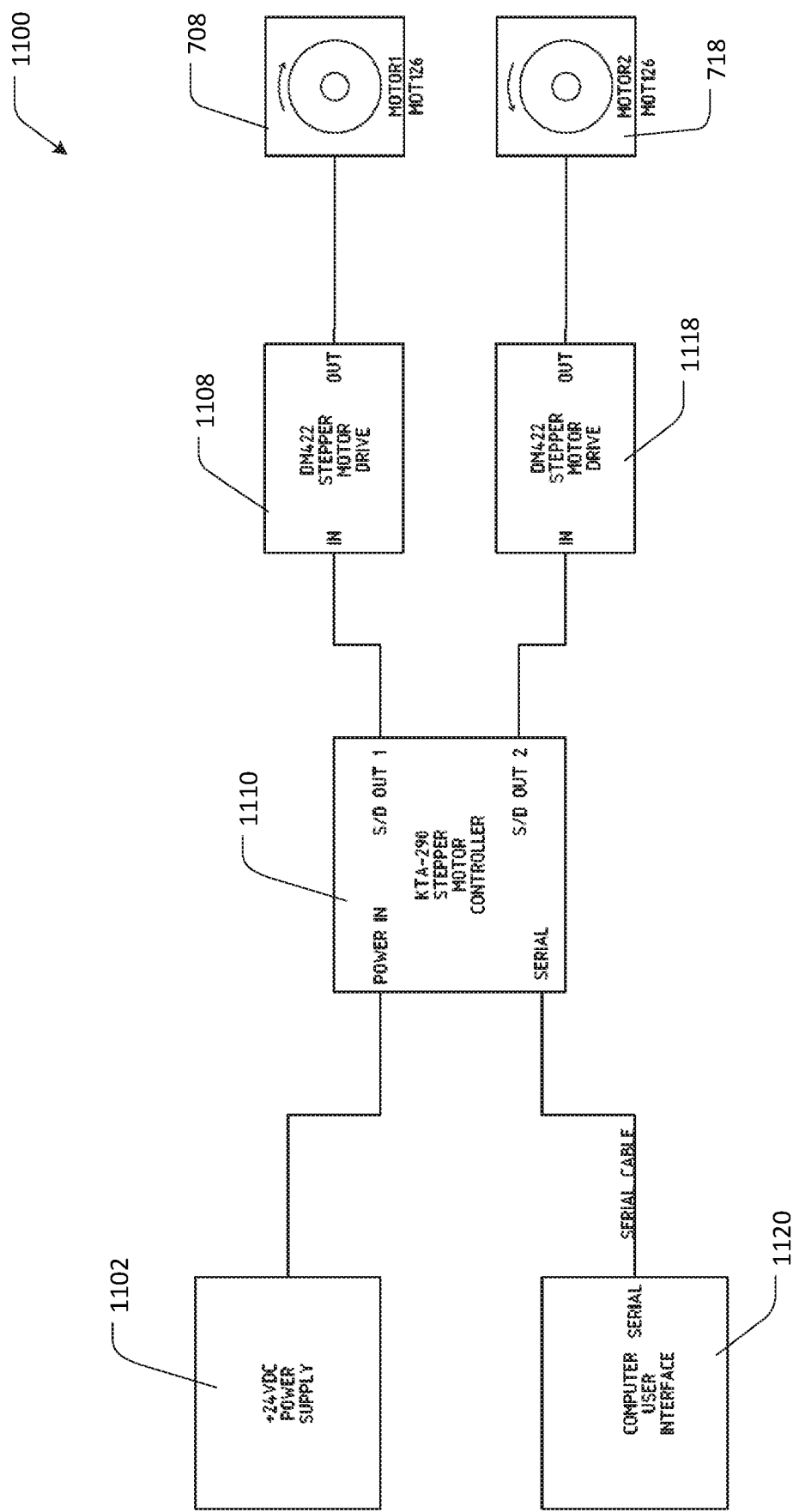
FIG. 11 is a block diagram showing a motor control subsystem, according to some embodiments.

Referring to FIG. 11, a motor control subsystem 1100 is shown according to some embodiments. The subsystem 1100 comprises the apparatus 700 described with reference to FIGS. 7A to 7C and a controller 1110 configured to control the rotation of the workpiece 100. This is achieved by controlling operation of the first and second motors 708, 718 by sending synchronised signals to first and second motor drivers 1108, 1118 respectively. In response to the synchronised signals, the first and second motor drivers 1108, 1118 regulate the supply of power to the motors 708, 718 to cause simultaneous co-rotation of the spindles 704, 714. The subsystem 1100 further comprises a power supply 1102, such as a 24 Volt DC power supply, to supply power to the controller 1110, motor drivers 1108, 1118 and motors 708, 718.

In embodiments where the motors 708, 718 are arranged in antiparallel, as shown in FIGS. 7A to 7C, the motors 708, 718 must be configured for counter-rotation in order to achieve co-rotation of the spindles 704, 714 in the same direction. This can be achieved by operating the controller 1110 to send equal and opposite signals to the motor drivers 1108, 1118 to effect equal and opposite rotation of the motors 708, 718, i.e., clockwise and counter-clockwise, for example.

In order to ensure that the co-rotation of the spindles 704, 714 is substantially simultaneous (i.e., to reduce the likelihood of introducing angular differences due to delays between the signals for the two motors 708, 718), the motor drivers 1108, 1118 may comprise digital drivers with a suitable sampling rate, such that any signal delays are rounded off to provide simultaneous signals to the motors 708, 718. For example, suitable motor drivers include DM422-2 Phase Digital Stepper Drives, supplied by leadshine.com. An example of a suitable controller 1110 that can be used for controlling the motor drivers 1108, 1118 is the KTA-290 serial stepper motor controller supplied by oceancontrols.com.au.

The subsystem 1100 may further comprise a serial interface 1120, including a serial cable, for example, to a computer 1240 (FIG. 12) to allow communication between the controller 1110 and the computer 1240. Alternatively, the controller 1110 and the computer 1240 may be configured to communicate via a suitable wireless communication protocol and each may include or employ suitable wireless communication subsystems for that purpose.

Figure 12:
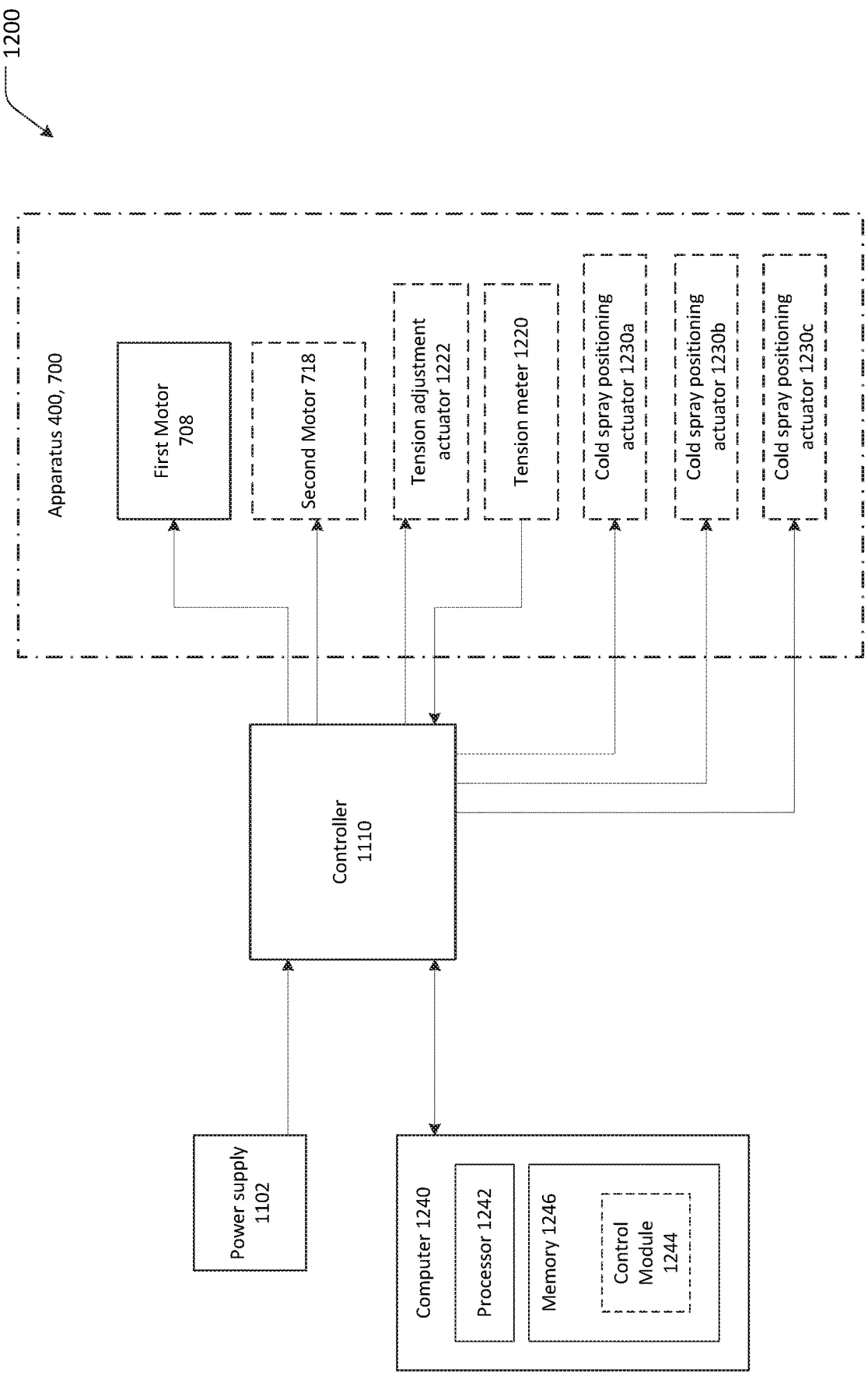
FIG. 12 is a block diagram showing a cold-spraying control system, according to some embodiments.

Referring to FIG. 12, a multifunction control system 1200 for holding a workpiece 100 under tension and controlling rotation of the workpiece 100 is shown, according to some embodiments. The system 1200 comprises the motor control subsystem 1100, a computer 1240 and an apparatus 400, 700 according to any one of the embodiments described herein; and a controller 1110 configured to control the rotation of the workpiece 100.

The apparatus 400, 700 comprises a first motor 708 configured to cause rotation of the workpiece 100 in response to a control signal from the controller 1110, The control signal may be provided to the motor 708 (and re-encoded as appropriate) via a motor driver 1108 as described in relation to FIG. 11. The controller 1110 controls the motor 708 by regulating the supply of power to the motor 708 from the power supply 1102.

The computer 1240 includes a computer processor 1242 configured to execute a control module 1244 stored on memory 1246 accessible to the processor 1242. The control module 1244 comprises executable program code that, when executed by the processor 1242, causes the processor 1242 to perform control functions in relation to apparatus 400, 700 as described herein. The control module 1244 is configured to provide control and monitoring functions in relation to performance of the cold spray process described herein. The control module 1244 (or another software application executable by processor 1242) is executable by the processor 1242 to provide a user interface to allow a user to provide input to be transmitted to the controller 1110 to control one or more operations of the apparatus 400, 700, The computer 1240 is communicatively coupled to the controller 1210, such as via a serial cable or a wireless connection, for example, to operate the controller 1110 via the user interface on the computer 1240.

In some embodiments, the apparatus 400, 700 may comprise a single motor 708 configured to drive rotation of the workpiece 100 as described above in relation to apparatus 400. In some embodiments, the apparatus 400, 700 may further comprise a second motor 718 configured as described in relation to apparatus 400 or 700 above, for example. The controller 1110 may be configured to control the first and second motors 708, 718 synchronously as described in relation to apparatus 700 above. The motors 708, 718 may be controlled via motor drivers 1108, 1118 as described in relation to subsystem 1100.

In some embodiments, the controller 1110 may be further configured to control a tension adjustment actuator 1222, as described in relation to apparatus 700 above.

In some embodiments, the apparatus 400, 700 may comprise a tension meter 1220 configured as described in relation to apparatus 400 and 700 above. The controller 1110 may be configured to receive a measurement signal from the tension meter 1220 indicating the level of tension applied to the workpiece 100, and control the tension adjustment actuator 1222 to adjust the tension applied to the workpiece in a feedback loop until a selected tension is achieved.

In some embodiments, the controller 1110 may further be configured to control one, two or more cold spray positioning actuators 1230 to control movement of a cold spray nozzle 310 to cold spray the workpiece 100 as described in relation to apparatus 700 above. For example, the apparatus 400, 700 may include three cold spray positioning actuators 1230*a*, 1230*b* and 1230*c*, each arranged to position the cold spray nozzle 310 in one of three different dimensions (i.e. X, Y and Z axes). The controller 1110 may be configured to control the actuators 1230 to control movement of the cold spray nozzle in one, two or three spatial dimensions, such as parallel to the axis of rotation of the workpiece, parallel to a central spray axis of the cold spray nozzle, or in a lateral direction perpendicular to both the central spray axis and the axis of rotation of the workpiece 100. In some embodiments, the controller 1110 may further be configured to control operations of the cold spray device 300.

As described above, while the exemplary embodiments are focussed on cold spraying delicate elongate workpieces such as 3D printed static mixer elements, the described apparatuses, systems and processes may be useful for supporting a number of different types of workpieces while one or more operations are performed on the workpiece.

Static Mixers

In one particular embodiment, the workpiece is a static mixer. The static mixer may be additive manufactured or 3D printed. The static mixer may be an integral element for a chemical reactor chamber, for example a continuous flow chemical reactor chamber. The static mixer may comprise a catalytically active scaffold defining a plurality of passages configured for dispersing and mixing one or more fluidic reactants during flow and reaction thereof through the mixer. The static mixer may be configured as a modular insert for assembly into a continuous flow chemical reactor or chamber thereof. The static mixer element may be configured as an insert for an in-line continuous flow chemical reactor or chamber thereof.

The workpiece, for example an additive manufactured workpiece (e.g. static mixer), may not be particularly strong under compression, although may be relatively stronger under tension. The workpiece may be fragile or brittle, for example where a certain longitudinal compressive force may break, bend, deform, fracture or otherwise damage the workpiece. For example, some workpieces may be damaged by a longitudinal compressive force greater than about 5 N, about 10 N, about 50 N, or about 100 N.

The static mixer element may be configured for enhancing mixing and heat transfer characteristics for redistributing fluid in directions transverse to the main flow, for example in radial and tangential or azimuthal directions relative to a central longitudinal axis of the static mixer element. The static mixer element may be configured for at least one of (i) to ensure as much catalytic surface area as possible is presented to the flow so as to activate close to a maximum number of reaction sites and (ii) to improve flow mixing so that (a) the reactant molecules contact surfaces of the static mixer element more frequently and (h) heat is transferred away from or to the fluid efficiently. The static mixer element may be provided with various geometric configurations or aspect ratios for correlation with particular applications. The static mixer elements enable fluidic reactants to be mixed and brought into close proximity with the catalytic material for activation. The static mixer element may be configured for use with turbulent flow rates, for example enhancing turbulence and mixing, even at or near the internal surface of the reactor chamber housing. The configurations may also be designed to enhance efficiency, degree of chemical reaction, or other properties such as pressure drop (whilst retaining predetermined or desired flow rates), residence time distribution or heat transfer coefficients.

The workpiece may be a static mixer element, scaffold, or reactor chamber thereof. Additive manufacturing of the static mixer and subsequent catalytic coating can provide a static mixer that is configured for efficient mixing, heat transfer and catalytic reaction (of reactants in continuous flow chemical reactors), and in which the static mixer may be physically tested for reliability and performance, and optionally further re-designed and re-configured using additive manufacturing (e.g. 3D printing) technology. Additive manufacturing provides flexibility in preliminary design and testing, and further re-design and re-configuration of the static mixers to facilitate development of more commercially viable and durable static mixers.

The static mixer element may be provided in a configuration selected from one or more of the following general non-limiting example configurations:
  open configurations with helices;
  open configurations with blades;
  corrugated-plates;
  multilayer designs;
  closed configurations with channels or holes.

The static mixer may be provided in a mesh configuration having a plurality of integral units defining a plurality of passages configured for facilitating mixing of the one or more fluidic reactants. The static mixer element may comprise a scaffold provided by a lattice of interconnected, segments configured to define a plurality of apertures for promoting mixing of fluid flowing through the reactor chamber. The scaffold may also be configured to promote both heat transfer as well as fluid mixing.

In various embodiments, the geometry or configuration may be chosen to enhance one or more characteristics of the static mixer element selected from: the specific surface area, volume displacement ratio, line-of-sight accessibility for cold-spraying, strength and stability for high flow rates, suitability for fabrication using additive manufacturing, and to achieve one or more of: a high degree of chaotic advection, turbulent mixing, catalytic interactions, and heat transfer.

The workpiece (e.g. static mixer) may be configured to enhance chaotic advection or turbulent mixing, for example cross-sectional, transverse (to the flow) or localised turbulent mixing. The geometry of the workpiece (e.g. static mixer) may be configured to change the localised flow direction or to split the flow more than a certain number of times within a given length along a longitudinal axis of the static mixer element, such as more than 200 $m^{-1}$, more than 400 $m^{-1}$, more than 800 $m^{-1}$, more than 1500 $m^{-1}$, more than 2000 $m^{-1}$, more than 2500 $m^{-1}$, more than 3000 $m^{-1}$, or more than 5000 $m^{-1}$. The geometry or configuration may comprise more than a certain number of flow splitting structures within a given volume of the static mixer, such as more than 100 $m^{-3}$, more than 1000 $m^{-3}$, more than $1\times10^{-4}$ $m^{-3}$, more than $1\times10^{6}$ $m^{-3}$, more than $1\times10^{9}$ $m^{-3}$, or more than $1\times10^{10}$ $m^{-3}$.

The geometry or configuration of the workpiece (e.g. static mixer or scaffold thereof) may be substantially tubular or rectilinear. The workpiece may be formed from or comprise a plurality of segments. Some or all of the segments may be straight segments. Some or all of the segments may comprise polygonal prisms such as rectangular prisms, for example. The workpiece may comprise a plurality of planar surfaces. The straight segments may be angled relative to each other. Straight segments may be arranged at a number of different angles relative to a longitudinal axis of the scaffold, such as two, three, four, five or six different angles, for example. The workpiece may comprise a repeated structure. The workpiece may comprise a plurality of similar structures repeated periodically along the longitudinal axis of the scaffold. The geometry or configuration of the scaffold may be consistent along the length of the scaffold. The geometry of the scaffold may vary along the length of the scaffold. The straight segments may be connected by one or more curved segments. The scaffold may comprise one or more helical segments. The scaffold may generally define a helicoid. The scaffold may comprise a helicoid including a plurality of apertures in a surface of the helicoid.

The dimensions of the workpiece (e.g. static mixer) may be varied depending on the application. The static mixer, or reactor comprising the static mixer, may be tubular. The workpiece may, for example, have a diameter (in mm) in the range of 1 to 5000, 2 to 2500, 3 to 1000, 4 to 500, 5 to 150, or 10 to 100. The workpiece may, for example, have a diameter (in mm) of at least about 1, 5, 10, 25, 50, 75, 100, 250, 500, or 1000. The workpiece may, for example, have a diameter (in mm) of less than about 5000, 2500, 1000, 750, 500, 250, 200, 150, 100, 75, or 50. The aspect ratios (L/d) of the workpiece may be provided in a range suitable for industrial scale flow rates for a particular reaction. The aspect ratios may, for example, be in the range of about 1 to 1000, 2 to 750, 3 to 500, 4 to 250, 5 to 100, or 10 to 50. The aspect ratios may, for example, be less than about 1000, 750, 500, 250, 200, 150, 100, 75, 50, 25, 20, 15, 10, 9, 8, 7, 6, 5, 4, 3, or 2. The aspect ratios may, for example, be greater than about 1, 2, 3, 4, 5, 6, 7, 8, 9, 10, 15, 20, 25, 50, 75, or 100.

The workpiece may be generally provided with a high specific surface area. The specific surface area ($m^2$ $m^{-3}$) may be in the range of 100 to 40,000, 200 to 30,000, 300 to 20,000, 500 to 15,000, or 12000 to 10,000. The specific surface area ($m^2$ $m^{-3}$) may be at least 100, 200, 300, 400, 500, 750, 1000, 2000, 3000, 4000, 5000, 7500, 10000, 15000, 17500, or 20000. It will be appreciated that the specific surface areas can be measured by a number of techniques including the BET isotherm techniques.

The workpiece (e.g. static mixer elements) may be configured for enhancing properties, such as mixing and heat transfer, for laminar flow rates or turbulent flow rates. It will be appreciated that for Newtonian fluids flowing in a hollow pipe, the correlation of laminar and turbulent flows with Reynolds number (Re) values would typically provide laminar flow rates where Re is <2300, transient where 2300<Re<4000, and generally turbulent where Re is >4000. The static mixer elements may be configured for laminar or turbulent flow rates to provide enhanced properties selected from one or more of mixing, degree of reaction, heat transfer, and pressure drop. It will be appreciated that further enhancing a particular type of chemical reaction will require its own specific considerations.

In one embodiment, the static mixer element may be generally configured for operating at a Re of at least 0.01, 0.1, 1, 5, 50, 100, 150, 200, 250, 300, 350, 400, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, 10000. The static mixer element may be configured for operating in a generally laminar flow Re range of about 0.1 to 2000, 1 to 1000, 10 to 800, or 20 to 500, The static mixer element may be configured for operating in a generally turbulent flow Re ranges of about 1000 to 15000, 1500 to 10000, 2000 to 8000, or 2500 to 6000.

The volume displacement % of the static mixer relative to a reactor chamber for containing the mixer is in the range of 1 to 40, 2 to 35, 3 to 30, 4 to 25, 5 to 20, or 10 to 15. The volume displacement % of the static mixer relative to a reactor chamber for containing the mixer may be less than 40%, 35%, 30%, 25%, 20%, 15%, 10%, or 5%.

The configurations of the static mixers may be provided to enhance cross-sectional microscopic turbulence. The turbulent length scales may, for example, be in the range of microscopic length scales. The configurations of the static mixers may be provided to enhance heat transfer properties in the reactor, for example a reduced temperature differential at the exit cross-section.

The static mixer may be configured such that, in use, the pressure drop (i.e. pressure differential or back pressure) across the static mixer (in Pa/m) is in a range of about 0.1 to 1,000,000 Pa/m (or 1 MPa/m). The static mixers may be configured to provide a lower pressure drop relative to a specific flow rate. In this regard, the static mixers, reactor, system, and processes, as described herein, may be provided with parameters suitable for industrial application. The above pressure drops may be maintained where the volumetric flow rate is at least 0.1, 0.5, 1, 1.5, 2, 2.5, 3, 3.5, 4, 4.5, 5, 6, 7, 8, 9, 10, 20, 30 40, 50 ml/min.

The workpiece, for example the static mixer, may be made by the additive manufacture (i.e. 3D printing) techniques. For example, an electron beam 3D printer or a laser beam 3D printer may be used. The additive material for the 3D printing may be, for example, titanium alloy based powders (e.g. 45-105 micrometre diameter range) or the cobalt-chrome alloy based powders (e.g. FSX-414) or stainless steel or aluminium-silicon alloy. The powder diameters associated with the laser beam printers are typically lower than those used with electron beam printers.

3D printing is well understood and refers to processes that sequentially deposit material onto a powder bed via fusion facilitated by the heat supplied by a beam, or by extrusion and sintering-based processes. 3D printable models are typically created with a computer aided design (CAD) package. Before printing a 3D model from an STL file, it is typically examined for manifold errors and corrections applied. Once that is done, the .STL file is processed by software called a "slicer," which converts the model into a series of thin layers and produces a G-code file containing instructions tailored to a specific type of 3D printer. The 3D printing process is advantageous for use in preparing the static mixer elements since it eliminates the restrictions to product design imposed by traditional manufacturing routes. Consequently, the design freedom inherent from 3D printing allows a static mixer geometry to be further optimised for performance than it otherwise would have been.

Catalyst Material

The workpiece (e.g. static mixer or scaffold thereof) may be formed from a catalytic material. For example, a catalyst material may be intercalated, interspersed and/or embedded with at least part of the scaffold.

It will be appreciated that the catalyst material of the scaffold or cold spray coating on the scaffold may be selected and varied based on a particular reaction or application required. The catalyst material may be selected to provide for heterogeneous catalysis reactions in a continuous flow reactor environment. A wide range of heterogeneous catalysis chemical reactions may be provided for by selection from a wide range of catalytic materials, including but not limited to the following: hydrogenations using hydrogen gas, transfer hydrogenations using a liquid hydrogen donor, catalytic oxidations, reductive aminations, carbon-carbon couplings including Suzuki, Sonogashira, Heck, Salle, Negishi, Ullmann, Kumada couplings and other metal catalysed organic transformations.

The workpiece or scaffold of the static mixer may comprise or consist of at least one of a metal, metal alloy, cermet and metal oxide. The scaffold may be a metal scaffold, for example formed from metals or metal alloys. The scaffold may be formed from a metal or metal alloy capable of catalytic reactions, such as palladium. The metal scaffold may be prepared from a material suitable for additive manufacturing (i.e. 3D printing). The metal scaffold may be prepared from a material suitable for further surface modification to provide or enhance catalytic reactivity, for example a metal including nickel, titanium, palladium, platinum, gold, copper, aluminium or their alloys and others, including metal alloys such as stainless steel. In one embodiment the metal for the scaffold may comprise or consist of titanium, stainless steel, and an alloy of cobalt and chromium. In another embodiment, the metal for the scaffold may comprise or consist of stainless steel and cobalt chromium alloy. Using additive manufacturing techniques, i.e. 3D metal printing, the metal scaffold can be specifically designed to perform two major tasks: a) to act as a catalytic layer or a substrate for a catalytic layer, b) to act as a flow guide for optimal mixing performance during the chemical reaction and subsequently assist transfer of exothermic heat to the walls of the reactor tube (single phase liquid stream or multiphase stream) inside the reactor.

The catalytic material for forming the workpiece or for col(spray coating of the workpiece may comprise or consist of a metal selected from at least one of iron, aluminium, cobalt, copper, zinc, nickel, palladium, platinum, gold, silver, ruthenium, iridium, rhodium, titanium vanadium, zirconium, niobium, tantalum, and chromium, or a metal alloy, cermet or metal oxide thereof. The catalytic material may comprise or consist of titanium, aluminium, nickel, iron, silver, cobalt, chromium, or an alloy thereof. The catalytic material may comprise or consist of titanium, titanium alloy or stainless steel. The titanium alloy may comprise aluminium and vanadium, for example. Non-limiting examples of other transition metals that may be used in metal alloys are zirconium, niobium and tantalum.

In an embodiment, the catalytic material for forming the workpiece or for cold spray coating of the workpiece may comprise at least one of a metal, semi-metal and metal oxide. For example, the catalytic material may comprise one or more of the following:

a metal selected from iron, cobalt, chromium, aluminium, vanadium, copper, zinc, nickel, palladium, platinum, gold, silver, ruthenium, iridium, and rhodium, or alloys or mixtures thereof;

a semimetal selected from Bi, CdTe, HgCdTe, GaAs, or mixtures thereof; and a metal oxide selected from PhO, PbO2, ZnO, TiO2, CoO, Al2O3, or mixtures thereof.

A catalytic material may refer to a catalyst by itself or to a material or composition comprising a catalyst. The catalytic material may be provided in a composition with one or more additives, such as binders, to facilitate coating of the catalyst to the workpiece. The catalyst or coating thereof may be provided as a partial coating or a complete layer on the workpiece. The additives may include catalysts or promoters to enhance reaction rates at the static mixer surface. The catalyst material may include a dissociation catalyst, which may be chosen from the group consisting of molybdenum, tungsten, iron, ruthenium, cobalt, boron, chromium, tantalum, nickel, and alloys, compounds and mixtures thereof.

In one embodiment, the workpiece (e.g. static mixer) comprises or consists of titanium, nickel, aluminium, stainless steel, cobalt, chromium, any alloy thereof, or any combination thereof. In another embodiment, the workpiece (e.g. static mixer) comprises a stainless steel scaffold or a cobalt chromium alloy scaffold. The cold spray coating may comprise a metal selected from platinum or nickel. The weight % of the coating, based on total weight of the workpiece (e.g. static mixer), may be in the range of 1 to 40%, 2 to 35%, 5 to 30%, 10 to 25%, or 15 to 20%.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for holding a workpiece under tension while the workpiece is coated using a cold spraying process, the apparatus comprising:
    a frame;
    a first spindle rotatably coupled to the frame;
    a first coupler configured to couple the first spindle to a first end of the workpiece;
    a second spindle rotatably coupled to the frame;
    a second coupler configured to couple the second spindle to a second end of the workpiece;
    a backing plate fixed to the frame and configured to be disposed on one side of the workpiece extending at least partially between the first coupler and the second coupler, and configured to assist in supporting the workpiece during the cold spraying process;
    a first motor configured to rotate the first spindle; and
    a second motor configured to rotate the second spindle,
    wherein a distance between the first and second couplers is adjustable to hold the workpiece under tension between the couplers while the cold spraying process is performed, and
    wherein the workpiece can be rotated with the couplers and the spindles relative to the frame and the backing plate about a common axis of rotation extending between the couplers, and
    wherein the first motor and the second motor are configured to operate synchronously in opposite rotational directions to affect simultaneous co-rotation of the first and second spindles.

2. The apparatus of claim 1, further comprising a tension adjustment actuator configured to adjust the tension applied to the workpiece by adjusting the distance between the first and second couplers.

3. The apparatus of claim 1, wherein one or both of the couplers comprises a flexible coupler to provide rotational flexibility between the workpiece and one or both of the spindles.

4. The apparatus of claim 3, wherein the torsional stiffness of the or each flexible coupler is in the range of 20 N.m/rad to 200 N.m/rad.

5. The apparatus of claim 1, wherein the backing plate is coated with a non-stick film to reduce friction between the backing plate and the workpiece when in contact.

6. The apparatus of claim 1, wherein the backing plate defines a concave surface configured to at least partially surround one side of the workpiece.

7. The apparatus of claim 1, further comprising a cold spray device and a cold spray support frame with a mechanism configured to move a nozzle of the cold spray device along an axis parallel to the axis of rotation of the workpiece to cold spray the workpiece.

* * * * *